Dec. 19, 1967   B. L. A. VAN DER SCHEE   3,358,422
METHOD AND APPARATUS FOR DEGASSING A VISCOUS LIQUID
Filed Sept. 7, 1965   2 Sheets-Sheet 1
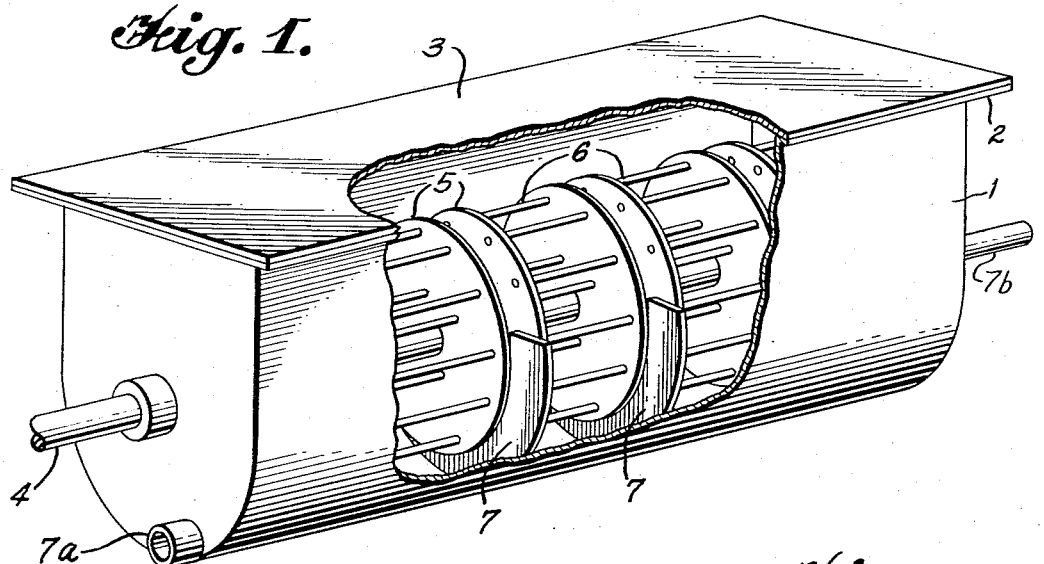
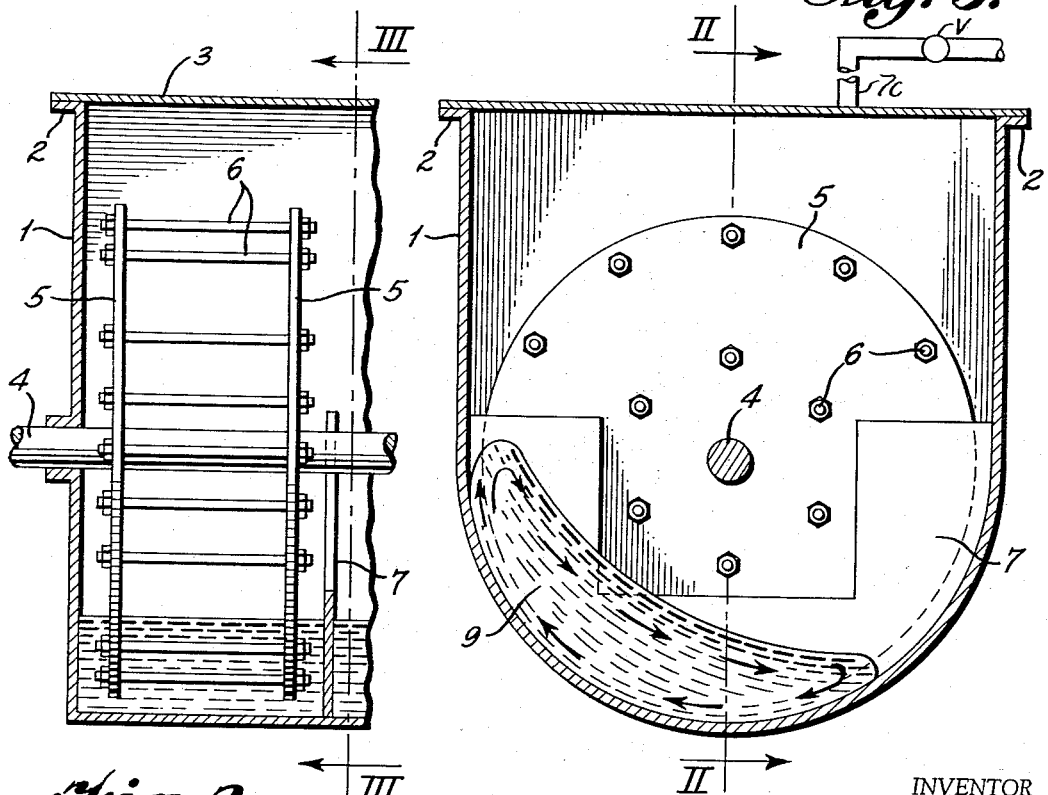
INVENTOR
Bernard Louis Anton Van Der Schee
BY
Stevens, Davis, Miller & Mosher
ATTORNEYS

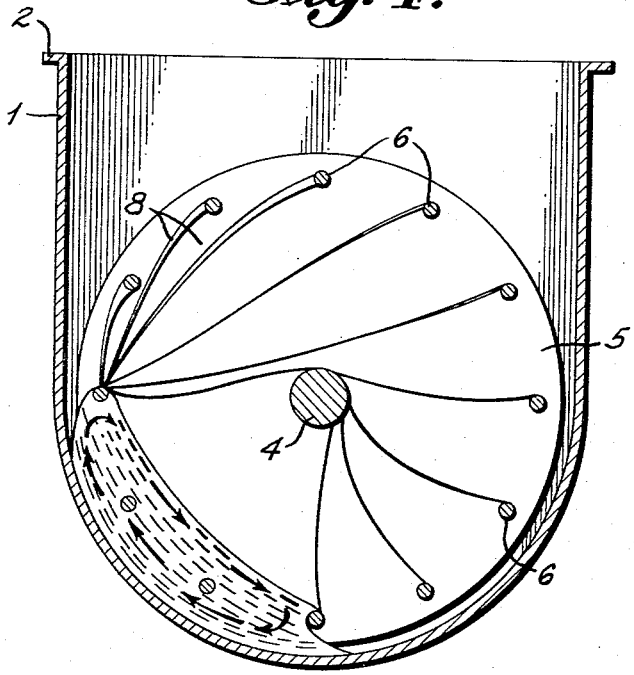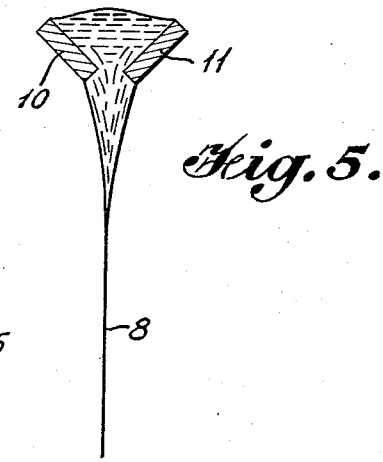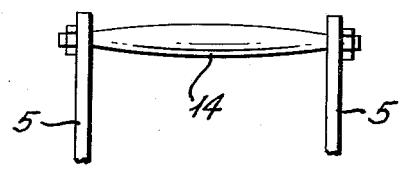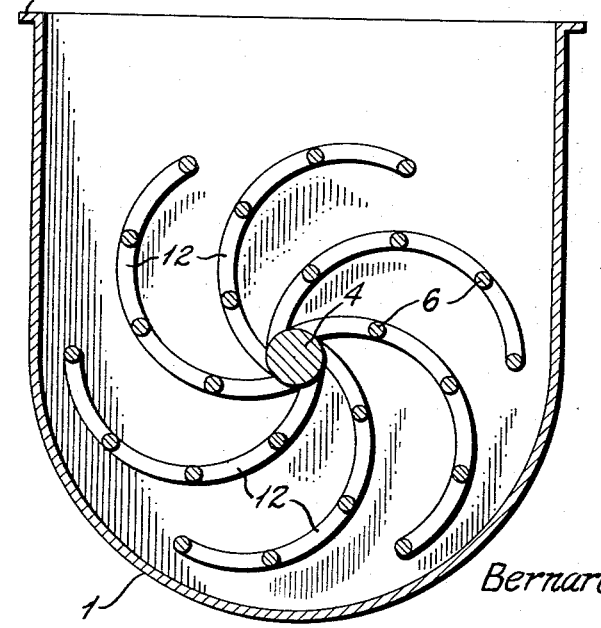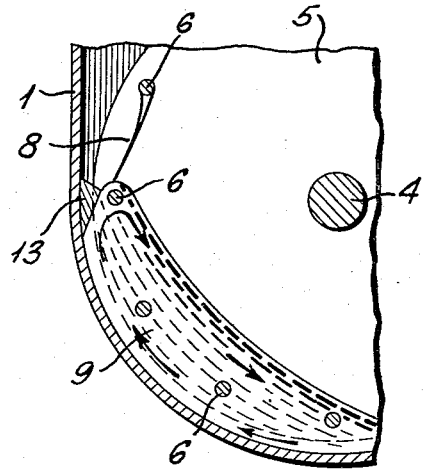

United States Patent Office 3,358,422
Patented Dec. 19, 1967

3,358,422
METHOD AND APPARATUS FOR DEGASSING A VISCOUS LIQUID
Bernard L. A. van der Schee, Arnhem, Netherlands, assignor to N.V. Onderzoekingstituut Research, Arnhem, Netherlands, a corporation of the Netherlands
Filed Sept. 7, 1965, Ser. No. 485,508
Claims priority, application Netherlands, Sept. 9, 1964, 64—10,463
20 Claims. (Cl. 55—52)

ABSTRACT OF THE DISCLOSURE

A method and apparatus for degassing a viscous liquid, such as polymeric condensation products, wherein thin films of the liquid are drawn from the main body thereof by elongate rod-like members which are movable through the liquid to emerge from its surface parallelly thereto. The viscosity of the liquid must be such that as the rod members emerge from the liquid they carry along a quantity of said liquid which stretches in the form of an unbroken sheet or film from the rod members back to the main body of the liquid, said film being exposed on both faces thereof to the surrounding environment.

---

This invention relates to a method and an apparatus for degassing a viscous liquid, more particularly, the degassing of a mixture which is being polymerized by condensation in which rod-like members are moved through the liquid while remaining parallel to the level of the liquid and subsequently leave the liquid in a movement transverse to the level of said liquid.

In a known method disclosed in United States Patent 2,964,391, use is made of an apparatus which includes two parallel shafts.

Connected to these two shafts are rod-like members which intermesh and move through the liquid mass in the same direction and subsequently emerge from said mass, drawing some amount of liquid.

The drawn liquid then drips down from the members in the form of a film or small streams and a fresh liquid surface is formed at which point the liquid can be degassed.

The rod-like members also serve to thoroughly mix the liquid so that the liquid at the surface is continuously refreshed and degassed.

The object of the above mentioned known invention is to carry out the method so that the continuously refreshed surface area of the liquid is as large as possible and remains available for a very short time.

The following serves to further clarify.

In the polycondensation of many substances the polycondensation reaction is attended with a decomposition reaction of the polycondensate.

The degree of polymerization of the product formed is thereby limited. In order to increase the degree of polymerization, the speed of the polycondensation reaction will have to be increased. For it is then that the speed at which the polycondensation proceeds will be higher than that of the decomposition reaction, and the final reaction equilibrium will obtain a higher degree of polymerization of the product.

However, since the speed of the polycondensation reaction is governed by the speed at which the gaseous substances evolved during polycondensation can be carried off, it is essential that the ready liberation of these substances from the mixture should be promoted as much as possible.

To this end it is necessary that every liquid particle get as near to the free surface area of the liquid as frequently as possible. It should be added that the mass flow by diffusion through a free surface of the liquid is proportional to the factor $$\frac{A}{\sqrt{t}}$$

where $A$ is the magnitude of the free surface area and $t$ the time elapsed since said area has been formed. This demonstrates the importance of the highest possible rate of formation of a largest possible available surface area of the liquid.

With the known methods, the films and small streams of liquid descending from the rod-like members form only relatively small freshly available surface areas. With the aid of the method according to this invention, however, a very considerable increase in the freshly formed surface area is obtained.

In accordance with the present invention, each rod-like member remains with both its ends in the immediate vicinity of the transverse members which are permanently dipped in the liquid mass. The viscosity of the liquid is chosen between 30 and 500 poises.

It has been found that by carrying out the method in this way (between the rod-like members and the transverse members), continuous films of liquid are drawn from the liquid mass. The films are bounded on all sides, viz, the rod-like members, the transverse members, and the liquid mass from which they are drawn.

Since the films have no free edges it will not be possible for them to become smaller in their own plane, which does happen in the case of prior art methods. In this connection the choice of the viscosity of the liquid between 30 and 500 poises has been found essential.

It has been found that if the viscosity of the liquid is lower than 30 poises, no continuous film can be drawn from the liquid mass so that the favorable effect of the present method is not produced.

Similarly, if the viscosity is higher than 500 poises, the liquid mass will be entrained by the rod-like members in its entirety, and no proper film will be formed. The above makes it clear that the method according to the invention is particularly advantageous if it is applied as an intermediate step in a polycondensation reaction. Prior to carrying out the method, the mixture to be polymerized by condensation must first be of a viscosity of at least 30 poises. After the process, the mixture must, by a different method, be brought to an even higher viscosity.

The principal advantage of the new method is in that the increase in viscosity of the mixture from 30 to 500 poises can be effected so rapidly that the decomposition reaction is given very little time to progress.

In further polycondensation of the product obtained by this method, it is now possible as a consequence to reach very high degrees of polymerization.

The present invention also relates to an apparatus for carrying out the above-described method.

The present apparatus is of a type known in itself, which comprises a liquid trough containing a longitudinally positioned rotatable shaft with a driving system, and to which shaft there are connected rod-like members extending parallel to said shaft.

The known embodiment of an apparatus of the type described above, the rod-like members are attached to supports at *one* end, and they in turn are attached to the shaft.

In the apparatus according to the invention however, transverse members are provided which extend from both ends of each rod-like member to beyond the center of the rotatable shaft. Each rod-like member, together with the two transverse members and the liquid mass form a frame to hold a film of liquid as it is drawn from the liquid mass by the rod-like member.

In one embodiment of the present invention, the transverse members comprise partly fixed partitions which are attached to the trough perpendicular to the shaft, leaving a very smalll clearance for the ends of the rod-like members to move past said partitions. This embodiment has the advantage that its construction is very simple, especially if the presence in the liquid trough of fixed partitions is also desired for some other reason.

It has been found, however, that a greater stability of the liquid films can be obtained if at least part of the transverse members, and preferably all, are attached both to the ends of the rod-like members and to the shaft.

This can be effected very simply if, according to the invention, all the transverse members consist of round disks coaxial with the shaft.

In that case every rod-like member is attached between two of these disks. However, this embodiment may have the disadvantage of the disks forming large permanent surfaces to which a film of liquid adheres and which is not readily refreshed.

This drawback may be obviated according to the invention if the transverse members are not made to consist of disks, but of spiral-shaped bars which extend in a plane perpendicular to the shaft and having one end thereof attached to said shaft.

In this way, the surface area to which an insufficiently refreshed layer of liquid may adhere, is reduced to a minimum. Moreover, since the surface is now interrupted in the direction of rotation, the poorly refreshed layer of liquid will also become thinner. The spiral shape of the transverse members are adapted to the shape which the liquid films tend to assume by nature.

In many cases, it will be sufficient to provide a single circle of rod-like members around the shaft. However, greater stability of the films of liquid can be obtained if the rod-like members are provided in a plurality of concentric circles in accordance to one embodiment of the invention. However, it should be noted that every additional circle of rod-like members means an enlargement of the permanent surface to which an insufficiently refreshed layer of liquid adheres.

The number of circles in which the rod-like members are provided would have to be chosen as a function of the nature of the liquid and other conditions. As the rod-like members move farther away from the liquid mass, the film thus formed will become larger.

In order to maintain this growing film surface, it is necessary to keep up a supply of liquid thereto. The supply of liquid is hardly kept up or only partially so by liquid flowing from the liquid mass in the trough. On the contrary, the liquid of the film will rather tend to gravitate.

The film must therefore be kept up by liquid which is drawn from the rod-like members.

The greater the amount of liquid which the rod-like members are able to draw, the longer the liquid film that will be maintained.

There may be circumstances in which the liquid flow from the rod-like members is insufficient. In that case, it is advantageous to have each rod-like member comprise two long strips which are shaped in the form of a funnel in accorrdance with another embodiment of the invention.

The funnels so formed scoop up an extra large amount of liquid which is gradually drawn through a slit formed by the two strips. However, if the rod-like members are in one piece it is possible to form them so that the film is maintained for a longer period of time. For it has been found that the critical thickness of the films is in the middle and in the immediate vicinity of the rod-like members.

If, according to the invention, the rod-like members are circular in cross-section and barrel shaped, i.e. bulging in the middle, the film formed below the rod-like members can be given a constant thickness.

The film of liquid is formed immediately below the rod-like members at the moment it leaves the liquid mass in the trough. At higher viscosities or speeds the bulk of the liquid mass is driven farther up the wall of the trough.

The point at which the fims are drawn from the liquid mass is therefore not clearly defined and depends on various conditions. Moreover, the efficiency of the surface area exchanged decreases as the viscosities or speeds increase.

Greater stability of the liquid films is obtained according to the invention, if on the wall of the trough (the side where the rod-shaped members move upwards), there is provided a sharp longitudinal ridge at about the level of the shaft, and at a distance which is only little greater than that distance between the shaft and the rod-like member which is farthest away from said shaft. In this way the point at which the film is drawn from the liquid mass is sharply defined.

It is often desirable to use the apparatus in a continuously operating reactor. In that case it is not only necessary that the liquid be in rotary motion about the shaft, but also that it gradually displaces in an axial direction.

In order to acquire a homogeneous quality of the reaction mixture it has been found desirable to try to obtain a uniformly advancing axial flow of the liquid.

According to the invention this is achieved when the trough of the apparatus is placed in a slightly inclined position and is divided into compartments by partitions. In each of the compartments there is a system of rod-like members, and in each partition there is an overflow opening, the lowest point of which is just above the level of the liquid when the latter is at rest. Also, the opening is in the direction of rotation, positioned on a straight line descending from the shaft, which line is at an angular distance of about 45° from said vertical line descending from said shaft.

While the apparatus is in operation the liquid mass in the trough will be pushed upwards towards one side of the trough by the rotating system of rod-like members.

This leads not only to vigorous circulation of the liquid but also to the level of the liquid taking up a position at an angle with the horizontal. This angle is dependent on the viscosity of the liquid. With a central overflow opening there would be a different amount of liquid in each compartment, due to the increasing viscosity in the reactor. As a result of the above-described overflow the liquid cannot flow in axial direction when the shaft is stationary, but it can do so when the shaft is rotating. Moreover, the amount of liquid in each compartment has become almost independent of the viscosity.

The flow is then such that the liquid does not flow backwards.

The invention will be further described with the aid of the accompanying figures which represent the various embodiments of the apparatus according to the invention as well as the details thereof.

FIGURE 1 shows a view in perspective of an apparatus consisting of several compartments.

FIGURE 2 shows a compartment in longitudinal section.

FIGURE 3 shows the same compartment in cross-section.

FIGURE 4 shows the flow pattern in a compartment.

FIGURE 5 shows a modified embodiment of a detail shown in FIGURE 4.

FIGURE 6 shows variation of the embodiment of the apparatus shown in FIGURE 3.

FIGURE 7 shows a detail of the liquid trough.

FIGURE 8 shows a variation of the embodiment of the detail shown in FIGURE 5.

In FIGURE 1, which is a side view in perspective of an apparatus according to the invention, the numeral 1 refers to a liquid trough. This liquid trough is placed in an inclined position. The liquid trough has its top edge provided with a flange 2 to which a cover may be secured so that the trough is airtight (see FIGURES 2 and 3).

A drive shaft 4 runs through the liquid trough throughout the length thereof. On shaft 4 are mounted a plurality of disks 5 which are interconnected in pairs by circularly arranged bars 6. At the left-hand end wall of the liquid trough, below the shaft, there is provided an outlet opening 7a to which a line may be connected through which the processed material may be transported. An inlet opening 7b is provided leading into the other end of the trough.

FIGURES 2 and 3 respectively represent longitudinal and cross sectional views of the last compartment of the apparatus in which the liquid passes through. These figures show that the trough is divided into compartments by means of transverse partitions 7. These transverse partitions 7 extend to the wall of the liquid trough up to about the level of the shaft. In its middle, the partition 7 is recessed to just above the level of liquid when the latter is at rest (FIGURE 2).

While the apparatus is in operation the surface of the liquid will be inclined, so that it is just above the left hand corner of the recess in the transverse partition 7 (see FIG. 3). In this way a gradual flow of liquid in an axial direction is obtained.

It has been found that if the partition is so shaped, the overflow will be practically constant for virtually any speed of the shaft. To this end the left-hand corner of the recess in the partition 7 must be at an angular distance of about 45° from the vertical descending from the shaft.

For it has been found that over a wide range of viscosities or speeds the plane of the liquid surface passes approximately through said point.

In this way it can be ensured that all the various compartments have practically the same liquid content.

FIGURE 4 shows the flow pattern of the liquid during operation of the apparatus.

It demonstrates that the liquid mass in the trough is driven towards the left and that the surface of the liquid takes up an inclined position.

The arrows indicate the directions in which the liquid flow circulates within the liquid mass.

It has been found that due to the bars 6 the liquid is thoroughly mixed passing through the liquid mass. Every time a bar 6 emerges from the liquid mass it carries along with it an amount of liquid, but this liquid remains in contact with the main mass 9. In this way a film 8 is formed which is kept stretched in a transverse direction by the walls 5. A vacuum is created in the trough and, owing to the large surface area of the films 8, it will be possible for the volatile matter present in the liquid to evaporate to a very large extent and be carried off through the vacuum vent line 7c which is connected to vacuum means V.

The surfaces on either side of each film actively participate in the evaporation process. In this case the exchanging surface area is twice as large as that of films supported by walls.

Moreover, the volume of liquid which is not regularly refreshed is reduced to a minimum. This is due to the fact that there is practically no wall surface for the liquid to adhere to.

FIGURE 5 shows how the cross-section of the bars 6 can advantageously be modified. Each bar 6 is replaced by strips 10 and 11 which are positioned at some angle relative to one another to form a funnel, and so that a slit is left between them.

The funnels so formed scoop up an extra amount of liquid from the liquid mass 9, which liquid is gradually fed to the films through said slit.

FIGURE 6 shows how the bars 6 can be connected to the shaft without being fixed between disks. Attached to the shaft 4 are a number of spiral-shaped arms 12 which all lie in the same plane radiating from the shaft.

Bars 6 are attached to these arms. The shape of the arms 12 is chosen so that the films can be given the best possible support.

As is shown in FIGURE 6 the bars 6 are arranged in 4 circles. The number of these bars and the number of concentric circles in which they are arranged is governed by the viscosity of the liquid and the speed of the shaft. The higher the viscosity, the longer the distance between the bars. This is because in that case the films are stronger. But if the bars are placed too close together, the liquid cannot flow away from between the bars, but rather the liquid is drawn as if it were in big lumps, and no continuous film is formed.

It has been found that if the viscosity of the liquid is lower than 30 poises there is practically hardly any film formation, or the films formed are so thin that they readily break. At a viscosity higher than 500 poises the films become so thick that they can hardly be regarded as such. In that case practically the entire liquid contents of the trough is wound around the shaft and the bars in a thick layer.

An advantage of the embodiment shown in FIGURE 6 is that the surface area of the liquid which is not thoroughly refreshed is reduced to a minimum.

FIGURE 7 shows a detail of the trough wall.

In the place where the transverse displacement of the liquid mass 9 is limited (the left-hand side) the trough wall is provided with a sharp ridge 13.

It has been found that owing to the presence of this sharp ridge, it is possible to form the films in exactly the same place, which causes the apparatus to function more regularly.

Finally, FIGURE 8 represents a variation of one of the bars. The bar 14 differs from the bars 6 shown in FIGURE 2 in that it is barrel-shaped, i.e. it is thicker in the middle than at the ends.

For it has been found that the liquid which adheres to the bar is drawn off into the gradually enlarging film mainly from the middle of the bar.

It is, therefore, at the middle of the bar that the film gets relatively thin and as a result thereof eventually breaks.

It has been found that the thickened part of the bar draws an additional amount of liquid, which is just sufficient to compensate for the relatively high degree of stretch the film is subjected to at said particular point.

While the embodiments are disclosed as having the liquid drawn from the liquid mass, it is to be understood that other words such as entrain or attenuate may be used to describe the liquid being drawn from said mass.

While the invention has been described with the specific embodiments disclosed hereinabove, it is to be understood that changes may be made to the specification and/or drawings without departing from the spirit and scope of the invention as claimed.

What is claimed is:

1. In the intermediate stages of a poly-condensation process wherein the polymer reaction mass has a viscosity in the range of 30 to 500 poises and wherein it is desired to effect degassing of said mass, comprising the steps of:
   (a) providing a chamber partially filled with a liquid reaction mass;
   (b) lifting a quantity of the liquid along a longitudinal extent of the surface thereof in a continuous movement substantially perpendicular away from said surface;
   (c) permitting the lifted quantity of liquid to distend itself to the maximum extent possible in a continuous, unbroken film back towards the main body of liquid in the bottom of said chamber in a manner whereby both faces of said film are fully exposed from the furthest point of lifting to the surface of the main body of liquid and whereby entrained gases may escape from both said faces;
   (d) framing the film along its radially extending edges from both axial ends of said member and up to the axis about which said member moves to thereby limit the extent to which said film may distend itself in a longitudinal direction;

(e) interposing no means to deliberately break the liquid film; and, (f) evacuating the liberated gases from said chamber.

2. The method of claim 1, wherein step (b) is performed by passing an elongate member through said liquid mass by revolving said member about an axis which extends substantially parallel to the surface of said mass; and wherein step (d) is performed by confining the opposite ends of said member between wall means extending radially from each of the member ends to said axis.

3. The method of claim 2, including the step of passing a plurality of said rods in succession through said liquid mass by revolving a plurality of circumferentially spaced apart rods about said axis, and maintaining a free circumferential space between successive ones of said rods, permitting a liquid film to distend from each rod back to the main body of liquid as the rods revolve about said axis.

4. The method of claim 3, including the step of passing a plurality of said members through said liquid mass by revolving respective groups of said members along respective circles of different radius concentric with said axis.

5. The method of claim 2, wherein step (b) is performed by revolving funnel-shaped elongate trough members through the liquid mass with the liquid being scooped into said members and then being permitted to flow out of the neck thereof in the form of a thin film toward the main body of liquid.

6. An apparatus for degassing a liquid polymer reaction mass during the intermediate polycondensation stages wherein said mass has a viscosity in the range of 30 to 500 poises, comprising: a chamber defining a trough in the bottom thereof for holding a viscous liquid, a liquid inlet and a liquid outlet for permitting flow of reaction mass through said chamber and a gas vent for evacuating gases from said chamber, a liquid drawing means including an elongate member in said chamber extending longitudinally parallel to the bottom thereof, means to repetitively move said elongate member in transverse direction parallelly along said bottom and subsequently in a direction substantially perpendicular to and away from said bottom, flow limit means comprising a wall means extending transversely to the length of said elongate member from each end thereof to the axis about which said member moves, said elongate member being adapted to pass through and out of a liquid mass contained in said trough and to draw a portion of said liquid along its length in the form of a thin film out of said mass with said flow limit means limiting the axial extent to which said film can distend in a longitudinal direction along said member.

7. The apparatus of claim 6, including a rotatable shaft extending through said chamber parallel to the bottom thereof, a plural number of said elongate member being arranged in circumferentially spaced apart relationship concentrically about said shaft, said members being connected to said shaft so as to revolve together therewith.

8. The apparatus of claim 6, including a partition means dividing said trough into a plurality of axially successive compartments, overflow means interconnecting said compartments successively to each other, one of said liquid drawing means being provided for each of said compartments.

9. The apparatus of claim 6, wherein said flow limit means comprises a disc attached to said shaft and having said elongate members extending axially therefrom from a point radially inwardly displaced from its outermost radial edge whereby the radial face of said disc forms a radially extending flange portion surrounding said elongate member at its end.

10. The apparatus of claim 8, wherein the longitudinal axis of said trough is inclined whereby the said successive compartments are successively elevated relative to each other along said axis of said trough.

11. The apparatus of claim 10, wherein said flow limit means comprises a disc attached to said shaft and having said elongate members extending axially therefrom in an upwardly inclined direction parallel to said axis of said trough.

12. The apparatus of claim 6, wherein said flow limit means comprises a plurality of spirally shaped arms radiating from said shaft in a common perpendicular plane, a plurality of said elongate members extending axially from each said arm in radially spaced relationship along each arm, said arm forming a radial abutment surface at the end of said elongate members.

13. The apparatus of claim 6, wherein said elongate member is in the form of a solid rod.

14. The apparatus of claim 13, wherein said rod is barrel-shaped in longitudinal cross section.

15. The apparatus of claim 6, wherein said elongate member is funnel-shaped in cross section whereby liquid may pass downwardly through a restricted longitudinally extending aperture in the bottom of said member.

16. The apparatus of claim 13, wherein said trough is laterally delimited by a longitudinally extending and inwardly directed protrusion on the inner wall of said chamber, said elongate member being arranged to move at a certain distance from the bottom of said trough and past said protrusion at a closer distance than said certain distance.

17. The apparatus of claim 16, said protrusion including a sharp edge at its inwardmost point.

18. The apparatus of claim 8, wherein said overflow means is comprised by an opening in said partition means located above the bottom of said trough and along an axis which is substantially at an angle of forty-five degrees to the vertical axis of said partition means in the direction of movement of said elongate member.

19. The apparatus of claim 6, including a vacuum means adapted to draw a vacuum in said chamber, said chamber being gas-tight.

20. The apparatus of claim 6, wherein said elongate member is comprised of continuous longitudinal surfaces from end to end thereof with no elements extending transversely thereto between the ends of said member.

References Cited

UNITED STATES PATENTS

| | | | |
|---|---|---|---|
| 289,786 | 12/1883 | Taylor et al. | 259—110 |
| 639,889 | 12/1899 | Corby et al. | 259—136 |
| 2,538,466 | 1/1951 | Marco | 259—136 |
| 3,229,449 | 1/1966 | Hogue | 55—193 |
| 2,964,391 | 12/1960 | Benson | 23—285 |
| 3,279,894 | 10/1966 | Tate et al. | 23—285 |

FOREIGN PATENTS

| | | |
|---|---|---|
| 21,708 | 12/1891 | Great Britain. |
| 27,820 | 12/1904 | Great Britain. |

SAMIH N. ZAHARNA, *Primary Examiner.*

REUBEN FRIEDMAN, *Examiner.*

C. N. HART, *Assistant Examiner.*